(12) United States Patent
Luo et al.

(10) Patent No.: US 9,300,479 B2
(45) Date of Patent: Mar. 29, 2016

(54) METHOD AND APPARATUS FOR PROTECTING DIGITAL CONTENT IN A STORAGE DEVICE

(71) Applicant: Sage Microelectronics Corp., Hangzhou (CN)

(72) Inventors: Jianjun Luo, Los Gatos, CA (US); Jianyun Fu, Hangzhou (CN); Danhua Lu, Hangzhou (CN)

(73) Assignee: SAGE MICROELECTRONICS CORP., Hangzhou (CN)

( * ) Notice: Subject to any disclaimer, the term of this patent is extended or adjusted under 35 U.S.C. 154(b) by 18 days.

(21) Appl. No.: 13/913,178

(22) Filed: Jun. 7, 2013

(65) Prior Publication Data

US 2013/0332735 A1 Dec. 12, 2013

(30) Foreign Application Priority Data

Jun. 8, 2012 (CN) .......................... 2012 1 0193210

(51) Int. Cl.
G06F 21/10 (2013.01)
H04L 9/32 (2006.01)

(52) U.S. Cl.
CPC .............. *H04L 9/3273* (2013.01); *G06F 21/10* (2013.01); *H04L 2209/60* (2013.01)

(58) Field of Classification Search
CPC ....... G06F 21/10; G06F 21/78; G06F 21/445; G11B 20/00086; G11B 20/0021; H04L 2209/60; H04L 2209/603
See application file for complete search history.

(56) References Cited

U.S. PATENT DOCUMENTS

| | | | | |
|---|---|---|---|---|
| 6,789,177 B2 * | 9/2004 | Okada | ..................... | G06F 21/10 375/E7.009 |
| 2003/0177379 A1 * | 9/2003 | Hori | ....................... | G06F 21/10 713/193 |
| 2005/0210236 A1 * | 9/2005 | Lee | ......................... | G06F 21/78 713/153 |
| 2005/0259816 A1 * | 11/2005 | Han | ................. | G11B 20/00086 380/44 |
| 2008/0155260 A1 * | 6/2008 | Perez | .................... | H04L 9/0869 713/169 |
| 2008/0219451 A1 * | 9/2008 | Ju | ........................ | G06F 21/445 380/282 |
| 2008/0229104 A1 * | 9/2008 | Ju | ............................ | H04L 9/32 713/169 |
| 2009/0259850 A1 * | 10/2009 | Ishibashi | .............. | H04L 9/3273 713/169 |
| 2014/0047240 A1 * | 2/2014 | Kato | .................... | H04L 9/0866 713/171 |

* cited by examiner

*Primary Examiner* — Jason K. Gee
*Assistant Examiner* — Zhimei Zhu
(74) *Attorney, Agent, or Firm* — Han IP Corporation

(57) ABSTRACT

Techniques for protecting digital content in a storage device from pirate and illegal use are described. According to one aspect of the techniques, a method for protecting digital content stored in a storage device from illegally accessing by a host, comprises: exchanging data between the storage device and the host to achieve a mutual authentication between the storage device and the host; disabling an encryption/decryption module in the storage device to prohibit the host from reading out the digital content decrypted by the encryption/decryption module until the authentication of the storage device to the host passes; and disabling the host to prohibit the host from reading out the digital content decrypted by the encryption/decryption module if the authentication of the host to the storage device fails. Thereby, pirate and illegal use of the digital content stored in the storage device are effectively prevented or decreased.

11 Claims, 4 Drawing Sheets

An example of a First Original License File

| Location | Hex Value | Description |
|---|---|---|
| 0x00 | F6 28 55 AA, F6 28 55 AA, AA 00 00 00, 53 41 47 45 | FLAGa |
| 0x10 | 8A F2 43 2B, B9 73 01 5D, A6 23 15 B2, 42 82 76 EA | STUFFa |
| 0x20 | C9 C3 2F 01, 46 F6 79 A3, 8F 2E 6F 10, CE 13 F6 57 | STUFFa |
| | ..... STUFF ...... | STUFFa |
| 0x1E0 | 76 98 0D 1E, F5 25 D4 89, 6F 57 38 E6, FA 28 F4 18 | STUFFa |
| 0x1F0 | F6 28 55 AA, F6 28 55 AA, 00 00 00 00, 53 41 47 45 | FLAGa |

An example of a first active license file

| Location | Hex Value | Description |
|---|---|---|
| 0x00 | F6 28 55 AA, F6 28 55 AA, 00 00 FE 01, 53 41 47 45 | FLAGa |
| 0x10 | E0 12 4A 1B, 89 73 3E 0D, 45 CA 21 94, 48 02 76 C1 | Ra |
| 0x20 | 19 23 5D EF, 93 C6 78 2A, 34 71 D6 F0, 2E 33 4D 5B | STUFFa |
| | ..... STUFF ...... | STUFFa |
| 0x1E0 | E6 77 8E F4, A5 23 B2 82, 6C 59 38 EF, 70 28 B4 C2 | STUFFa |
| 0x1F0 | F6 28 55 AA, F6 28 55 AA, 00 00 00 00, 53 41 47 45 | FLAGa |

An example of a second active License File

| Location | Hex Value | Description |
|---|---|---|
| 0x00 | F6 28 55 AA, F6 28 55 AA, 00 00 FD 02, 53 41 47 45 | FLAGb |
| 0x10 | 35 91 AB 3C, 68 2F 99 DE, 20 42 E8 AF, 06 39 22 F7 | Rb |
| 0x20 | 3D 50 A0 FF, 1F D9 73 A1, E2 9C 67 84, 37 1B 56 01 | STUFFb |
|  | ..... STUFF ...... | STUFFb |
| 0x1E0 | 56 D7 81 EB, 95 CC 92 78, 6E 56 35 1F, F6 79 B4 82 | STUFFb |
| 0x1F0 | F6 28 55 AA, F6 28 55 AA, 00 00 00 00, 53 41 47 45 | FLAGb |

FIG. 7

An example of a third active License File

| Location | Hex Value | Description |
|---|---|---|
| 0x00 | F6 28 55 AA, F6 28 55 AA, 00 00 FC 03, 53 41 47 45 | FLAGc |
| 0x10 | 0B 2E 3F C8, 3F F1 18 3C, A9 55 27 C4, 4E 2A 76 05 | ECPc |
| 0x20 | F3 9D C0 13 FC EA A3 DF 5D 6A 11 F9 F7 12 16 08 | STUFFc |
|  | ..... STUFF ...... | STUFFc |
| 0x1E0 | DB 73 90 39 C5 38 C5 26 39 3B 9D 7E A1 6A D3 69 | STUFFc |
| 0x1F0 | F6 28 55 AA, F6 28 55 AA, 00 00 00 00, 53 41 47 45 | FLAGc |

FIG. 8

An example of a fourth active License File

| Location | Hex Value | Description |
|---|---|---|
| 0x00 | F6 28 55 AA, F6 28 55 AA, 00 00 FB 04, 53 41 47 45 | FLAGd |
| 0x10 | 08 6D 1E 27, F0 7E 95 97, 20 EE BD B3, D7 91 EF FA | ECPd |
| 0x20 | D3 2F 98 03 14 3F 31 38 15 E7 D1 B9 82 73 B8 0E | STUFFd |
|  | ..... STUFF ...... | STUFFd |
| 0x1E0 | 0E 0D 44 42 26 80 BA 0E A4 7A 29 20 7A 9A 9C 20 | STUFFd |
| 0x1F0 | F6 28 55 AA, F6 28 55 AA, 00 00 00 00, 53 41 47 45 | FLAGd |

FIG. 9

METHOD AND APPARATUS FOR PROTECTING DIGITAL CONTENT IN A STORAGE DEVICE

CROSS-REFERENCE TO RELATED APPLICATIONS

This application claims priority to Chinese Patent Application No. 201210193210.8, filed on Jun. 8, 2012, the disclosures of which are incorporated herein by reference in their entirety for all purposes.

BACKGROUND OF THE INVENTION

1. Field of the Invention

The present invention is related to copyright projection field, particularly to a method and an apparatus for protecting digital content in a storage device.

2. Description of Related Art

Digital distribution products such as digital videos, digital music, digital maps of a Global Positioning System, etc. are easy to be copied, duplicated or used illegally at present. As a result, pirate and illegal use of the digital distribution products are widespread, which is a serious impediment to the development the Digital distribution and bring great loss to owners of the digital copyright. There is no particular effective digital copyright protection method in the prior art.

BRIEF SUMMARY OF THE INVENTION

Thus, improved techniques for protecting digital content effectively from pirate and illegal use are desired.

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

The present invention is related to techniques for protecting digital content in a storage device from pirate and illegal use.

The present invention may be implemented as an apparatus, a method or a system. According to one embodiment, the present invention is a method for protecting digital content stored in a storage device from illegally accessing by a host, comprising: exchanging data between the storage device and the host to achieve a mutual authentication between the storage device and the host; disabling an encryption/decryption module in the storage device to prohibit the host from reading out the digital content decrypted by the encryption/decryption module until the authentication of the storage device to the host passes; and disabling the host to prohibit the host from reading out the digital content decrypted by the encryption/decryption module if the authentication of the host to the storage device fails.

According to another embodiment, the present invention is a storage device for protecting digital content stored therein from illegally accessing by a host, comprising: a file system area configured for storing a file system; an original license file area configured for storing a first original license file, a second original license file, a third original license file and a fourth original license file, and each original license comprising a flag; a content protected area configured for storing the digital content; and an encryption/decryption module configured for encrypting the digital content wrote into the content protected area, decrypting the digital content read out the content protected area, and being disabled when an authentication of the storage device to the host device based on the original license files fails.

According to still another embodiment, the present invention is an apparatus for protecting digital content from illegally accessing, comprising: a storage device comprising an original license file area configured for storing a first original license file, a second original license file, a third original license file and a fourth original license file, a content protected area configured for storing the digital content, and an encryption/decryption module configured for encrypting the digital content wrote into the content protected area, and decrypting the digital content read out the content protected area; and a host configured for exchanging data with the storage device achieve mutual authentication between the storage device and the host, and being not able to access the digital content normally when the mutual authentication between the storage device and the host fails.

One object, feature and advantage of the present invention is that the host are prohibited from accessing the digital content stored in the storage device if the mutual authentication between the storage device and the host fails, and the host are allowed to access the digital content stored in the storage device normally if the mutual authentication between the storage device and the host passes, thereby preventing or decreasing pirate and illegal use of the digital content stored in the storage device effectively.

The foregoing and other objects, features and advantages of the invention will become more apparent from the following detailed description of a preferred embodiment, which proceeds with reference to the accompanying drawings.

BRIEF DESCRIPTION OF THE DRAWINGS

These and other features, aspects, and advantages of the present invention will become better understood with regard to the following description, appended claims, and accompanying drawings where:

FIG. 7 shows an example of a second active license file;

FIG. 8 shows an example of a third active license file; and

FIG. 9 shows an example of a fourth active license file.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Figure 1:
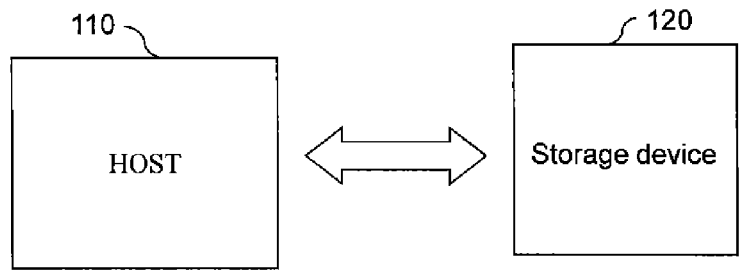
FIG. 1 is a block diagram showing an apparatus for projecting digital content from illegally accessing according to one embodiment of the present invention.

A method for protecting digital content stored in a storage device 120 shown in FIG. 1 from illegally accessing by a host 110 shown in FIG. 1, wherein the digital content stored in a storage device 120 may be encrypted and also referred as copyright file, encrypted content, protected content, etc. herein.

The host 110 may be a portable electronic product such as a mobile phone, a Global Positioning System device, a personal computer, a personal digital assistant, iPAD, iPOD, MP3/MP4 player or other digital content player. The storage device 120 may be a memory card such as a Security Digital Card (SD card), a Multi-Media Card (MMC), etc., and also may be a USB flash disk, a solid state drive (SSD), etc. The digital content with copyright is encrypted by an encryption/decryption module equipped in the storage device 120 and stored into the storage device 120.

The method for protecting digital content stored in the storage device 120 from illegally accessing by the host 110 according to one embodiment of the present invention comprises following operations. The host 110 exchanges data with the storage device 120 to achieve a mutual authentication between the storage device 120 and the host 110. The mutual authentication between the storage device 120 and the host 110 comprises the authentication of the storage device 120 to the host 110 and the authentication of the host 110 to the storage device 120. The storage device 120 enables the encryption/decryption module in the storage device 120 to allow the host 110 to read out the digital content decrypted by the encryption/decryption module when the authentication of the storage device 120 to the host 110 passes, namely the storage device 120 determines that the host is legal. The storage device 120 disables the encryption/decryption module in the storage device to prohibit the host 110 from reading out the decrypted digital content when the authentication of the storage device 120 to the host 110 fails, namely the storage device 120 determines that the host is illegal. The host 110 can not able to read out the digital content decrypted by the encryption/decryption module and reports an authentication error if the authentication of the host 110 to the storage device 120 fails, namely the host 110 determines that the storage device 120 is illegal.

Thus, the host 110 are prohibited from accessing the digital content stored in the storage device 120 if the mutual authentication between the storage device 120 and the host 110 fails, and the host are allowed to access the encrypted digital content stored in the storage device 120 normally if the mutual authentication between the storage device 120 and the host 110 passes, thereby effectively preventing or decreasing pirate and illegal use of the digital content stored in the storage device 120.

Depending on implementation, the digital content with copyright may be a digital map, the storage device 120 may be a SD card and the host 110 may be a GPS device. The digital map is encrypted by the encryption/decryption module and then stored into the SD card. The SD card exchanges data with the GPS device to achieve a mutual authentication between the SD card and the GPS device when the SD card is inserted into the GPS device. The GPS device are prohibited from accessing the encrypted digital content stored in the SD card if the mutual authentication between the SD card and the GPS device fails, and the GPS device is allowed to access and use the encrypted digital map stored in the SD card normally if the mutual authentication between the SD card and the GPS device passes, thereby protecting the digital map stored in the SD card from pirate and illegal use effectively.

Next, the mutual authentication between the storage device 120 and the host 110 as a key portion of the present invention will be described in details hereafter.

Figure 2:
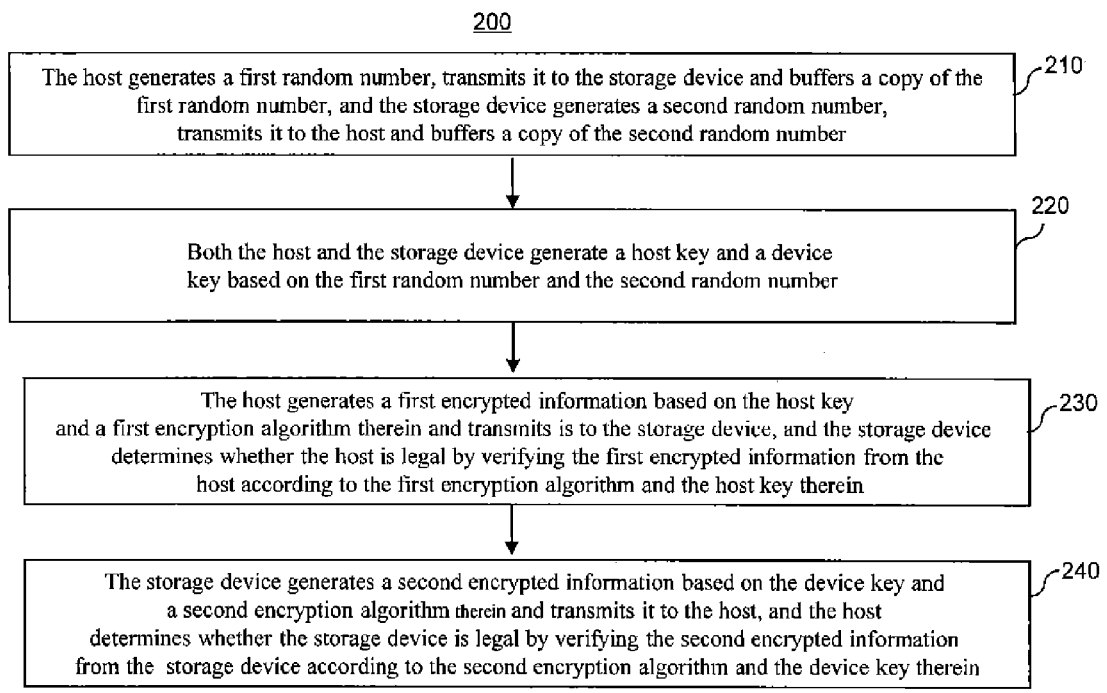
FIG. 2 is a flow chart showing a process of a mutual authentication between a storage device and a host according to one embodiment of the present invention.

FIG. 2 is a flow chart showing a process 200 of the mutual authentication between the storage device 120 and the host 110 according to one embodiment of the present invention. Referring to FIG. 2, the mutual authentication between the storage device 120 and the host 110 comprises following operations.

At 210, the host 110 generates a first random number, transmits the first random number to the storage device 120 and buffers a copy of the first random number, and the storage device 120 generates a second random number, transmits the second random number to the host 110 and buffering a copy of the first random number. As a result, the host 110 has the first random number and the second random number, and the storage device 120 also has the first random number and the second random number.

At 220, both the host 110 and the storage device 120 generate a host key and a device key based on the first random number and the second random number. In other words, the host 110 generates the host key and the device key based on the first random number and the second random number therein, and the storage device 120 also generates the host key and the device key based on the first random number and the second random number therein. As a result, the host 110 has the host key and the device key, and the storage device 120 also has the host key and the device key.

At 230, the host 110 generates a first encrypted information based on the host key and a first encryption/decryption algorithm therein and transmits the first encrypted information to the storage device 120, and the storage device 120 determines whether the host 110 is legal by verifying the first encrypted information from the host 110 according to the first encryption/decryption algorithm and the host key therein.

In one embodiment, the first encryption/decryption algorithm is preloaded into the host 110 and the storage device 120 respectively. The storage device 120 also generates a first reference information according to the first encryption/decryption algorithm and the host key therein, and compares the first reference information with the first encrypted information from the host 110. If the first reference information is matched or identical with the first encrypted information, the storage device 120 determines that the host 110 is legal, and the authentication of the storage device 120 to the host passes; otherwise, the storage device 120 determines that the host 110 is illegal, and the authentication of the storage device 120 to the host fails.

At 240, the storage device 120 generates a second encrypted information based on the device key and a second encryption/decryption algorithm therein and transmits the second encrypted information to the host 110, and the host 110 determines whether the storage device 120 is legal by verifying the second encrypted information from the storage device according to the second encryption/decryption algorithm and the device key therein.

In one embodiment, the second encryption/decryption algorithm is also preloaded into the host 110 and the storage device 120 respectively. The host 110 also generates a second reference information according to the second encryption/decryption algorithm and the device key therein, and compares the second reference information with the second encrypted information from the storage device 120. If the second reference information is matched or identical with the second encrypted information, the host 110 determines that the storage device 120 is legal, and the authentication of the host 110 to the storage device 120 passes; otherwise, the host 110 determines that the storage device 120 is illegal, and the authentication of the host 110 to the storage device 120 fails.

Figure 3:
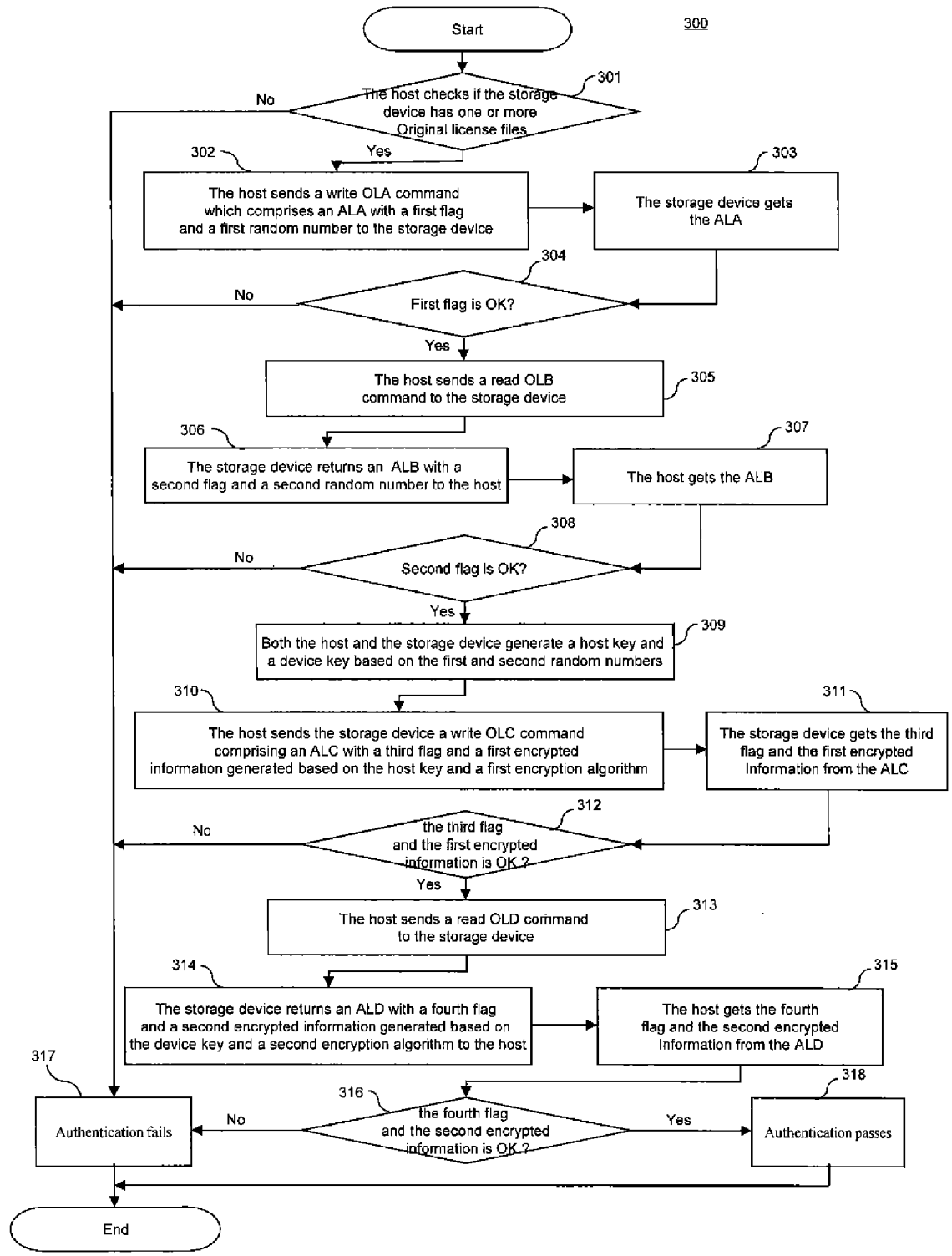
FIG. 3 is a flow chart showing a process of the mutual authentication between the storage device and the host according to another embodiment of the present invention.

FIG. 3 is a flow chart showing a process 300 of the mutual authentication between the storage device 120 and the host 110 according to another embodiment of the present invention.

Figures 4, 5, 6:
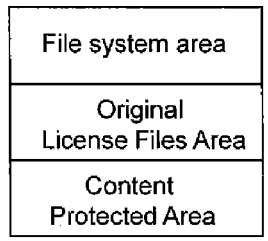
FIG. 4 is a schematic block diagram showing logical partitions of the storage device shown in FIG. 1.
FIG. 5 shows an example of a first original license file.
FIG. 6 shows an example of a first active license file.

In this embodiment, the storage device 120 is preloaded with a first original license file OLA, a second original license file OLB, a third original license file OLC and a fourth original license file OLD. Each original license file comprises a flag indicating identification thereof and a stuff number generated randomly. FIG. 5 is a table showing an example of the first original license file OLA, and other original license files OLB, OLC and OLD are identical with the first original license file in structure. Provided that the first original license file has 512 Bbytes, a first column of the table is location, a second column of the table is file data (Hex Value), and a third column of the table is description. In the first original license file, data located at 0x00 and 0x1F0 is the flag FLAGa of the first original license file, and data located from 0x10 to 0x1E0 is the stuff number STUFFa of the first original license file.

Referring to FIG. 4, the storage device 120 comprises a file system area configured for storing a file system (e.g. File Allocation Table), an original license file area configured for storing the original license files OLA, OLB, OLC and OLD and a content protected area configured for storing the encrypted digital content such as digital music, digital map, digital video etc.

A first active license file ALA, a second active license file ALB, a third active license file ALC and a fourth active license file ALD will be used during authentication described hereafter. Each active license file corresponds to one original license file and comprises a flag being identical with the flag of corresponding original license file, and the flag of the active or original license file is predefined by the host and the storage device.

Referring to FIG. 3, the mutual authentication between the storage device 120 and the host 110 comprises following operations.

At 301, the host 110 checks if the storage device 120 has one or more original license files.

Depending on implementation, the storage device 120 provides the file system thereof to the host 110 after the storage device 120 is connected to the host 110. The host 110 determines if the storage device 120 has one or more original license files by checking the file system of the storage device 120. If the storage device 120 has one or more original license files, the host determines that the storage device is legal and then the process 300 goes to 302; otherwise, the host determines that the storage device is illegal and then the process 300 goes to 317, which indicates that the authentication between the storage device 120 and the host 110 fails.

At 302, the host 110 sends a write first original license file OLA command comprising a first active license file ALA to the storage device 120. The first active license file ALA is generated by the host and comprises a first flag FLAGa, a first random number Ra and a first stuff number STUFFa. The first random number Ra and the first stuff number STUFFa are generated randomly. FIG. 6 shows an example of the first active license file ALA, wherein the first active license file has 512 Bbytes, data located at 0x00 and 0x1F0 is the first flag FLAGa, data located at 0x10 is the first random number Ra, and data located from 0x20 to 0x1E0 is the first stuff number STUFFa.

At 303, the storage device 120 gets the first active license file ALA and extracts the first flag FLAGa and the first random number Ra from the first active license file.

At 304, the storage device determines whether the first flag FLAGa is correct. If the first flag FLAGa is correct, the storage device determines that the host may be legal and the process 300 enters into 305 for continuing authentication; otherwise, the storage device determines that the host is illegal and the process 300 enters into 317.

At 305, the host 110 sends a read second original license file OLB command to the storage device 120.

At 306, the storage device 120 prepares a second active license file ALB and returns the second active license file ALB to the host 110. The second active license file ALB comprises a second flag FLAGb, a second random number Rb and a second stuff number STUFFb. The second random number Rb and the second stuff number STUFFb are generated randomly. FIG. 7 shows an example of the second active license file ALB, wherein the second active license file has 512 Bbytes, data located at 0x00 and 0x1F0 is the second flag FLAGb, data located at 0x10 is the second random number Rb, and data located from 0x20 to 0x1E0 is the second stuff number STUFFb.

At 307, the host 110 gets the second active license file ALB and extracts the second flag FLAGb and the second random number Rb from the second active license file ALB.

At 308, the host 110 determines whether the second flag FLAGb is correctted. If the second flag FLAGb is correct, the host 110 determines that the storage device 120 may be legal and the process 300 enters into 309 for continuing authentication; otherwise, the host determines that the storage device is illegal and the process 300 enters into 317.

It can be seen that the operations from 302 to 308 is a process of preliminary authentication and data exchange between the host and the storage device. The host determines that the storage device may be legal, and the storage device determines that the host may be legal when the process 300 goes to 309. Additionally, the host 110 has the first random number Ra and the second random number Rb at this moment, and the storage device 120 also has the first random number Ra and the second random number Rb at this moment. The further authentication between the host 110 and the storage device 120 is described hereafter.

At 309, both the host and the storage device generate a host key Hkey and a device key Dkey based on the first random number Ra and the second random number Rb. For example, Hkey=Ra*Rb and Dkey=~(Ra*Rb), here "*" means logic exclusive-OR operation, "~" means logic NOT operation. In other words, the host 110 generates the host key Hkey and the device key Dkey based on the first random number Ra and the second random number Rb therein, and the storage device 120 also generates the host key Hkey and the device key Dkey based on the first random number Ra and the second random number Rb therein. As a result, the host 110 has the host key Hkey and the device key Dkey simultaneously, and the storage device 120 also has the host key Hkey and the device key Dkey simultaneously.

At 310, the host 110 sends a write third original license file OLC command comprising a third active license file ALC to the storage device. The third active license file ALC is prepared by the host 110 and comprises a third flag FLAGc, a first encrypted information ECPc and a third stuff number STUFFc. The third stuff number STUFFc is generated randomly, and the first encrypted information is generated by the host base on the host key Hkey and a first encryption/decryption algorithm FuncC in the host 110. The first encryption/decryption algorithm FuncC may be preloaded into the host 110 and the storage device 120. In one embodiment, ECPc=FuncC(Hkey), wherein the first encryption/decryption algorithm may be Advanced Encryption Standard algorithm (AES), Data Encryption Standard algorithm (DES) or other existing algorithms FIG. 8 shows an example of the third active license file ALC, wherein the third active license file has 512 Bbytes, data located at 0x00 and 0x1F0 is the third flag FLAGc, data located at 0x10 is the first encrypted information ECPc, and data located from 0x20 to 0x1E0 is the third stuff number STUFFc.

At 311, the storage device gets the third active license file ALC and extracts the third flag FLAGc and the first encrypted information ECPc from the third active license file.

At 312, the storage device 120 determines whether both the third flag and the first encrypted information are correctted.

Depending on implementation, the storage device determines whether the third flag FLAGc is correct firstly, and then determines whether the first encrypted information is correct. If the third flag FLAGc is correct, the storage device continues to determine whether the first encrypted information is correct; otherwise, the storage device determines that the host is illegal and the process 300 enters into 317. When the storage device determines whether the first encrypted information is correct, the storage device firstly generates a first reference information according to the first encryption/decryption algorithm and the host key therein, e.g. the first reference information=FuncC(Hkey). Then, the storage device compares the first reference information with the first encrypted information from the host. Finally, if the first reference information is matched or identical with the first encrypted information, the storage device determines that the host is legal and the process 300 enters into 313 for continuing authentication; otherwise, the storage device determines that the host is illegal and the process 300 enters into 317.

It can be seen that the operations from 310 to 312 is the further authentication of the storage device to the host. If the further authentication of the storage device to the host passes, the storage device determines that the host must be legal; otherwise, the storage device determines that the host is illegal.

At 313, the host 110 sends a read fourth original license file OLD command to the storage device.

At 314, the storage device 120 prepares a fourth active license file ALD and returns the fourth active license file to the host 110. The fourth active license file ALD comprises a fourth flag FLAGd, a second encrypted information ECPd and a fourth stuff number STUFFd. The fourth stuff number STUFFd is generated randomly, and the second encrypted information is generated by the storage base on the device key Dkey and a second encryption/decryption algorithm FuncD in the storage device 120. The second encryption/decryption algorithm FuncD may be preloaded into the host 110 and the storage divice 120. In one embodiment, ECPd=Funcd(Dkey), wherein the second encryption/decryption algorithm may be Advanced Encryption Standard algorithm (AES), Data Encryption Standard algorithm (DES) or other existing algorithms. FIG. 9 shows an example of the fourth active license file ALD, wherein the fourth active license file has 512 Bbytes, data located at 0x00 and 0x1F0 is the fourth flag FLAGd, data located at 0x10 is the second encrypted information ECPd, and data located from 0x20 to 0x1E0 is the fourth stuff number STUFFd.

At 315, the host 110 gets the fourth active license file ALD and extracts the fourth flag FLAGd and the second encrypted information ECPd from the fourth active license file.

At 316, the host determines whether both the fourth flag and the second encrypted information are corrected.

Depending on implementation, the host determines whether the fourth flag FLAGd is correct firstly, and then determines whether the second encrypted information is correct. If the fourth flag FLAGd is correct, the host 110 continues to determine whether the second encrypted information is correct; otherwise, the host determines that the storage device is illegal and the process 300 enters into 317. When the host determines whether the second encrypted information is correct, the host firstly generates a second reference information according to the second encryption/decryption algorithm and the device key therein, e.g. the second reference information=FuncD(Dkey). Then, the host compares the second reference information with the second encrypted information from the storage device. Finally, if the second reference information is matched or identical with the second encrypted information, the host determines that the storage device is legal and the process 300 enters into 318 which indicate that the authentication between the host and the device passes; otherwise, the host determines that the storage device is illegal and the process 300 enters into 317.

It can be seen that the operations from 313 to 316 is the further authentication of the host to the storage device. If the further authentication of the host to the storage device passes, the host determines that the storage device must be legal; otherwise, the host determines that the storage device is illegal.

It is understood to those skilled in the art that the process 300 of the mutual authentication is described as a non-limitation example, and some modification can be made to the process 300 within the spirit of the present invention. In a modified embodiment, the operations from 305 to 308 may be performed firstly, and the operations from 302 to 304 may be performed subsequently. In another modified embodiment, the operations from 313 to 316 may be performed firstly, and the operations from 309 to 312 may be performed subsequently. In still another modified embodiment, the operation 301 may be not necessary, and the process 300 may begin at 302 directly.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A method for protecting a digital content stored in a storage device from unauthorized accessing by a host, comprising:
   exchanging data between the storage device and the host to achieve mutual authentication between the storage device and the host;
   disabling an encryption/decryption module in the storage device to prohibit the host from reading out the digital content decrypted by the encryption/decryption module until the authentication of the storage device to the host passes; and reporting an authentication error by the host so that the host cannot read the digital content decrypted by the encryption/decryption module if the authentication of the host to the storage device fails, wherein the storage device is preloaded with a first original license file, a second original license file, a third original license file and a fourth original license file, and each original license comprises a flag and a padding number, wherein achieving the mutual authentication between the storage device and the host comprises:

sending a write first original license file command comprising a first active license file with a first flag and a first random number to the storage device by the host;

obtaining the first active license file and extracting the first flag and the first random number from the first active license file by the storage device;

determining that the host may be authorized if the first flag is determined to be correct by the storage device; and determining that the host is unauthorized and the authentication between the storage device and the host fails if the first flag is determined to be incorrect by the storage device, wherein in an event that the storage device determines that the host may be authorized, achieving the mutual authentication between the storage device and the host further comprises:

sending a read second original license file command to the storage device by the host;

returning a second active license file with a second flag and a second random number to the host;

obtaining the second active license file and extracting the second flag and the second random number from the second active license file by the host;

determining that the storage device may be authorized if the second flag is determined to be correct by the host; and determining that the storage device is unauthorized and the authentication between the storage device and the host fails if the second flag is determined to be incorrect by the host, wherein in an event that the host determines that the storage device may be authorized, achieving the mutual authentication between the storage device and the host further comprises generating a host key and a device key based on the first random number and the second random number by the host and the storage device respectively;

sending a write third original license file command comprising a third active license file with a third flag and a first encrypted information generated base on the host key generated by the host and a first encryption algorithm to the storage device by the host;

obtaining the third active license file and extracting the third flag and the first encrypted information from the third active license file by the storage device;

determining that the host must be authorized and the authentication of the storage device to the host passes if both the third flag and the first encrypted information are determined to be correct by the storage device; and determining that the host is unauthorized and the authentication between the storage device and the host fails if either the third flag or the first encrypted information is determined to be incorrect by the storage device.

2. The method as claimed in claim 1, wherein whether the first encrypted information is correct is determined based on the host key generated by the storage device and the first encryption algorithm by the storage device.

3. The method as claimed in claim 1, wherein if the storage device determines that the host must be authorized, achieving the mutual authentication between the storage device and the host further comprises:

sending a read fourth original license file command to the storage device by the host;

returning a fourth active license file with a fourth flag and a second encrypted information generated base on the device key generated by the storage device and a second encryption algorithm to the host by the storage device;

getting the fourth active license file and extracting the fourth flag and the second encrypted information from the fourth active license file by the host;

determining that the storage device must be authorized and the authentication of the host to the storage device passes if both the fourth flag and the second encrypted information are determined to be correct by the host; and determining that the storage device is unauthorized and the authentication between the storage device and the host fails if either the fourth flag or the second encrypted information is determined to be incorrect by the host.

4. The method as claimed in claim 3, wherein whether the second encrypted information is correct is determined based on the device key generated by the host and the second encryption algorithm by the host.

5. The method as claimed in claim 1, wherein the storage device comprises a file system area configured for storing a file system, an original license file area configured for storing the original license files and a content protected area configured for storing the encrypted digital content.

6. The method as claimed in claim 1, further comprising:
checking whether the storage device has the original license files; and
determining that the authentication between the storage device and the host fails if the storage device does not have the original license files.

7. An apparatus for protecting a digital content from unauthorized access, comprising:
a storage device comprising an original license file area configured for storing a first original license file, a second original license file, a third original license file and a fourth original license file, a content protected area configured for storing the digital content, and an encryption/decryption module configured for encrypting the digital content written into the content protected area, and decrypting the digital content read out the content protected area; and
a host configured for exchanging data with the storage device to achieve mutual authentication between the storage device and the host, and not able to accessing the digital content normally when the mutual authentication between the storage device and the host fails,
wherein in achieving the mutual authentication between the storage device and the host, the storage device and the host are configured to perform operations comprising:
sending a write first original license file command comprising a first active license file with a first flag and a first random number to the storage device by the host;
obtaining the first active license file and extracting the first flag and the first random number from the first active license file by the storage device;
determining that the host may be authorized if the first flag is determined to be correct by the storage device; and determining that the host is unauthorized and the authentication between the storage device and the host fails if the first flag is determined to be incorrect by the storage device, wherein in an event that the storage device determines that the host may be authorized, in achieving the mutual authentication between the storage device and the host the storage device and the host are configured to perform operations comprising:

sending a read second original license file command to the storage device by the host;

returning a second active license file with a second flag and a second random number to the host;

obtaining the second active license file and extracting the second flag and the second random number from the second active license file by the host;

determining that the storage device may be authorized if the second flag is determined to be correct by the host; and determining that the storage device is unauthorized and the authentication between the storage device and the host fails if the second flag is determined to be incorrect by the host, wherein if the host determines that the storage device may be authorized, in achieving the mutual authentication between the storage device and the host the storage device and the host are configured to perform operations comprising:

generating a host key and a device key based on the first random number and the second random number by the host and the storage device respectively;

sending a write third original license file command comprising a third active license file with a third flag and a first encrypted information generated base on the host key generated by the host and a first encryption algorithm to the storage device by the host;

obtaining the third active license file and extracting the third flag and the first encrypted information from the third active license file by the storage device;

determining that the host must be authorized and the authentication of the storage device to the host passes if both the third flag and the first encrypted information are determined to be correct by the storage device; and determining that the host is unauthorized and the authentication between the storage device and the host fails if either the third flag or the first encrypted information is determined to be incorrect by the storage device.

8. The apparatus as claimed in claim 7, wherein whether the first encrypted information is correct is determined based on the host key generated by the storage device and the first encryption algorithm by the storage device.

9. The apparatus as claimed in claim 7, wherein if the storage device determines that the host must be authorized, achieving the mutual authentication between the storage device and the host further comprises:

sending a read fourth original license file command to the storage device by the host;

returning a fourth active license file with a fourth flag and a second encrypted information generated base on the device key generated by the storage device and a second encryption algorithm to the host by the storage device;

getting the fourth active license file and extracting the fourth flag and the second encrypted information from the fourth active license file by the host;

determining that the storage device must be authorized and the authentication of the host to the storage device passes if both the fourth flag and the second encrypted information are determined to be correct by the host; and determining that the storage device is unauthorized and the authentication between the storage device and the host fails if either the fourth flag or the second encrypted information is determined to be incorrect by the host.

10. The apparatus as claimed in claim 9, wherein whether the second encrypted information is correct is determined based on the device key generated by the host and the second encryption algorithm by the host.

11. The apparatus as claimed in claim 7, wherein the host checks whether the storage device has the original license files, and determines that the authentication between the storage device and the host fails if the storage device does not have the original license files.

* * * * *